March 21, 1967 A. T. DEUTSCH Re. 26,177

AUTOMATIC STEERING OF SPACE CRAFT

Original Filed July 28, 1961

INVENTOR

Alexander T. Deutsch

Saul B. Wiener

ATTORNEY

United States Patent Office

Re. 26,177
Reissued Mar. 21, 1967

26,177

AUTOMATIC STEERING OF SPACE CRAFT

Alexander T. Deutsch, 1735 Riggs Place NW., Washington, D.C. 20009

Original No. 3,145,531, dated Aug. 25, 1964, Ser. No. 127,657, July 28, 1961. Application for reissue Apr. 15, 1966, Ser. No. 544,665
7 Claims. (Cl. 60—202)

Matter enclosed in heavy brackets [ ] appears in the original patent but forms no part of this reissue specification; matter printed in italics indicates the additions made by reissue.

This invention relates to steering of space craft propelled by a jet of gases, charged ions, or the like, by controlling the direction of the reaction jet with respect to the axis of flight of the craft. In a preferred embodiment, this invention includes the steering of space craft by magnetic deformation of ionic propelling exhaust jets from the normal flow thereby, using the deflected particles to alter the course of the space craft.

As a second embodiment of the invention, exhaust propelling jets are deflected in the desired steering direction from one or more of several angularly disposed exhaust nozzles located at the propelling outlet of the space craft.

In a further modification of the present invention, a few of several symmetrically disposed jets are caused selectively to operate arcuate to the space craft's longitudinal axis to control the course of the space craft in flight. My steering units may, as embodied in this invention, be used to directionally control such space craft as manned and unmanned rockets, space craft for interplanetary travel, rocket nose cones, and the like.

This invention is further described in relation to the drawings herein:

Figure 8:
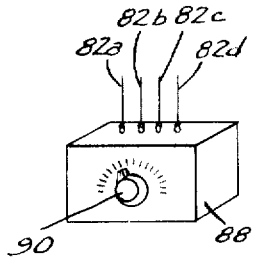
Figure 3:
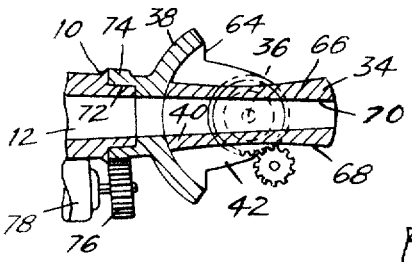
FIG. 3 illustrates a detailed modification of controlled jet outlet in which a pivotal exhaust outlet is provided for directing the exhaust gas jet.
Figure 4:
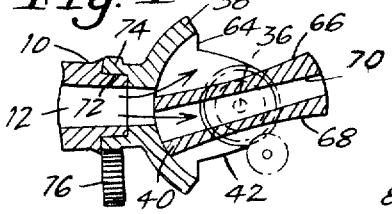
FIG. 4 illustrates the detailed modification of FIG. 3 in partially deflected position.
Figure 5:
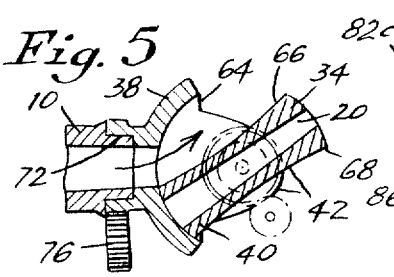
Figure 6:
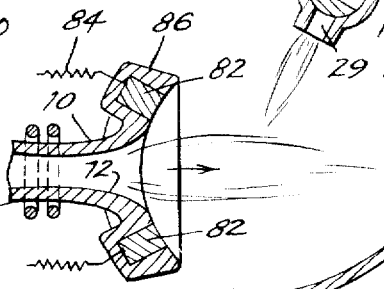
Figure 7:
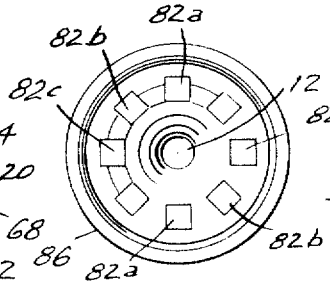
Figure 9:
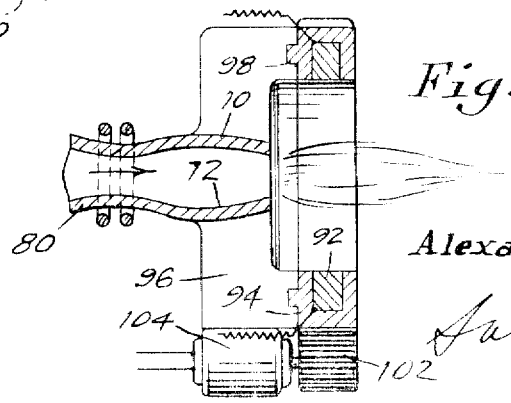
Figure 10:
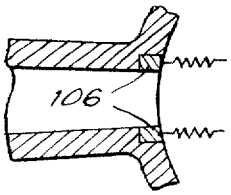

FIG. 5 further illustrates the detailed directional controlling means of FIG. 3 in total deflecting position;

FIG. 6 illustrates a steering embodiment of this invention as applied to ionic plasma, conducting, or polarized fluids;

FIG. 7 shows an arrangement of radially disposed magnets taken as an end view of FIG. 6 while FIG. 8 illustrates a type of magnetic control instrument for activating the steering magnetic fields;

FIG. 9 illustrates a further modification using magnetic steering whereby the magnets are oppositely disposed; and FIG. 10 illustrates a means for protecting the wall from the corrosive properties of the exhaust jet, using a magnet.

Figure 1:
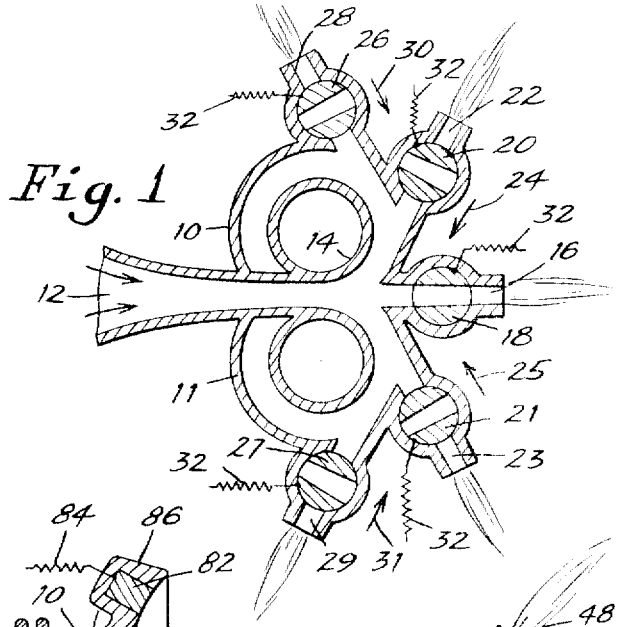
FIG. 1 illustrates a craft whose exhaust is divided among a plurality of tangentially disposed outlets.

Referring first to FIG. 1, the exhaust jet entering the radial manifolds 10 and 11 as shown by direction arrows 12 would normally pass straight through and out of the space craft by exhaust 16, but according to this embodiment the exhaust jet may be deformed by the radial housing 14 into a circular or arcuate path and directed to one of the steering units. The first jet nozzle 16 contains a controllable valve 18 which is normally open so that the gas is propelled substantially in the longitudinal axis of the craft. However, this valve 18 may be closed and one or more of the other valves such as 20 or 21 may be opened, whereby the gas will pass tangentally from outlets 22 and 23 respectively. By opening either valve 20 or 21, a torque movement is imparted to the space craft about its equilibrium point; and the space craft will be steered in the direction of arrows 24 or 25 respectively. Alternately, if the valves 26 or 27 are opened, the exhaust will pass through outlets 28 or 29, thereby directing the craft in directions indicated by arrows 30 or 31. If both valves 26 and 27 are opened simultaneously while the valves 16, 20 and 21 remain closed, a retarding retro thrust will be imparted to the space craft, thus slowing the craft down. In addition, several of the nozzles may be used in combination for controlled flight stability of the craft. The valves 18, 20, 21, 26 and 27 may be controlled as rotary or sliding plugs actuated electrically through a circuit shown by wires 32, remotely connected to and actuated by a control instrument within the craft. These valves may also be sliding armatures as solenoids, radially perforated, and operated within the passageways 16, 23, 29, 22 and 28.

Figure 2:
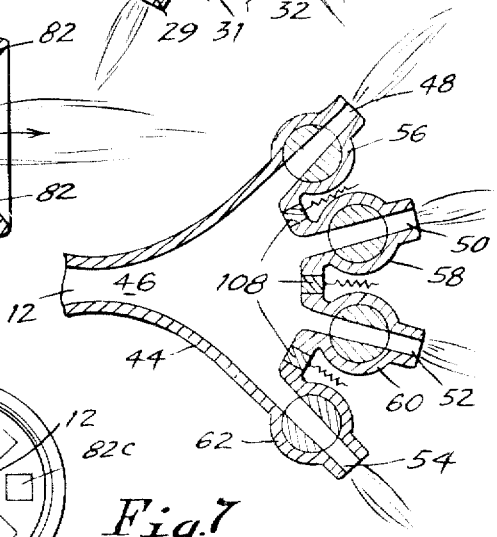
FIG. 2 illustrates a similar sectional view wherein a fan-shaped exhaust comprising a plurality of propelling jets, each of them individually controllable.

In an alternate method of steering, as illustrated in FIG. 2, the exhaust jet entering the housing 44 through inlet 46 is divided for continuous flow exhaust through each of several nozzles 48, 50, 52 and 54 which are open in normal operation for simultaneous emission of the exhaust gases as a plurality of jets. Each of these jets are controlled by valves 56, 58, 60 and 62 respectively which are shown in the open position. These valves are also independently controllable from a remote position for rotation or sliding, whereby any of the outlets may be closed as desired for steering. Thus the closure of valves 60 and 62 terminating the exhaustion through nozzles 52 and 54 causes jets 48 and 50 to unbalance the exhaust nozzle propulsion and to direct the space craft accordingly.

In the device shown in FIG. 3, the exhaust jet entering passageway 12 is intercepted and guided by a pivotally mounted nozzle 34 upon a pivot 36. The inlet passageway 12, in the exhaust housing 10, flares arcuately into a cup-shaped flange 38 against which the inner pivotal end 40 of the pivot 36 is supported in a pair of ear-shaped brackets 42, each extending from a peripheral edge 64 of the arcuate exhaust flange 38. The nozzle 34 has an upper 66 and lower 68 arcuately curved surface. The nozzle further has a tapered bore comprising outlet 70. In operation for normal flight, the nozzle passageway 70 is pivotally placed coaxial with the exhaust outlet 12. When it is desired to effect a steering of the craft, the nozzle 34 is moved arcuately on its pivot so that the inner and sliding contact with the flange 38 partially interrupts the gas flow as shown in FIG. 2 with a portion of the gas passing through nozzle 12 being emitted along the outer arcuate surface 66, and the rest of the gas passing through the now rotated nozzle 70. Both beams of gas are emitted angular to the housing 10 with a corresponding change of direction of the space craft integral therewith. Of course, if the nozzle 34 were deflected arcuately even a greater distance, all the gas emitted through nozzle would impinge upon the outer surface of the arcuate surface 66 or the nozzle 34 deflecting the gas in greater volume and to a greater angle for a radical turning torque. While the nozzle 34 is pivoted by gear 36 for swinging movement in one place, the plane itself can be rotated by the flange portion 38 being joined rotatably to the housings 10 and 72 and a ring gear mounted with a spur gear 76 driven by a motor 78. The gears 36 and 76 may be mounted for driving rotation to any plane desired, [therely] *thereby* giving universal steering central to the space craft.

FIG. 6 illustrates an alternate modification, useful primarily where the propulsion medium is an ionized plasma, formed preferably as described in my copending application, Ser. No. 39,392, filed June 28, 1961, where the ion containing gas formed in a plasma bottle shown as 80, enters the nozzle outlet 12 for emission from the rocket as a propulsive jet. As the ionized jet stream leaves the nozzle, it may not be subjected to steering forces and it will therefore have no steering effect upon the exhaust housing 10 or space craft integral therewith. Consequently, the propulsion will be in a straight line as shown by the directional pointer. The housing 10, however, carries a series of magnets 82, energied electrically at will through lines 84. As shown in FIG. 7, these magnets 82 are supported in an annular ring by a flange 86, integral with the housing 10. The magnets preferably are in opposite north and south pole pairs 82, 82b, 82c, etc. These pairs of magnets, as shown in FIG. 8, may be separately energied as alternate contact in a rotary switch box 88 having a dial 90 which may be rotated to a desired magnetic contact position for alternately energizing pairs of magnets 82a, 82b, etc. The ionic particles of the jet will tend to be moved at right angles to the applied magnetic field. In operation if, for example, 82a magnets were magnetically energized, the jet of ionized gas emitted through nozzle 12 will become deflected according to magnetic attraction-repulsion theory, toward one and away from the other, depending upon whether the ionic charge upon the gas is positive or negative. The effect, then would be to eject the outlet beam of gas between the pair of magnetic poles with subsequent steering effect by the magnetic field upon the housing 10 and the space craft integral therewith. Of course, the arrangement of electrical contacts in switching box 88 is such that the polarity between magnets 82a is reversed with the consequent reversal of the force effect upon the emitted ionic gas jet and the direction in which its beam is charged with a consequential reversal of the direction of the steering of the craft. For this purpose, of course, the 82a–82c wires may continue in a continuous series. For instance, before the magnets 82a would be reversed, magnets 82b would be first activated in the same direction, [the] *then* 82b; 82c contacted again but in reverse direction, then 82a, but in the reverse direction, etc. A consequence is that full dirigibility is available through application of paired magnets in the entire 360° cycle.

It is possible in an alternate procedure as shown in FIG. 9 to have the magnetic segments 92 mounted in opposite sides of a rotary magnet carried in an annular housing 94 supported by flange 96 attached to the housing 10 for rotation through bearings disposed in an annular groove 98. The outside of the housing may have a spur ring gear which meshes with a spur gear 102 for driving rotation by a motor 104 mounted upon the bracket 96. In this manner the magnetic segments 92 may be rotated to any desired position by actuation of the motor 104 with consequent application of the magnetic forces in any plane. This magnetic type of steering may be applied not only to the plasma, but to any polarized gas or gas seeded with ions responsive to a magnetic field.

Magnets may be mounted protectively, as well as for steering, at various places of an exhaust passageway normally carrying gaseous ions. For instance, as shown in detailed FIG. 10, a pair of magnets 106 are shown which serve primarily to protect the outlet against the excessive temperature of an ionized gas and other corrosive characteristics. Similar protective magnets 108, as shown in FIG. 2, may be mounted at various places to repel such points protecting them from excessive heat.

Various modifications within the description given may be made by those skilled in the art and, accordingly, the description given is intended to be arbitrary and not limiting except as defined in claims as appended hereto.

I claim:

1. In a means for steering a jet propelled device, comprising elongated annular walls, a main outlet jet coaxial with the body of said device to pass a propelling gas outwardly coaxial with the direction of movement of said device, means in said device for ionizing propellant gases passed therethrough as a jet, magnetic means for concentrating the ionized gas centrally of said device inward from the annular confining walls thereof, magnetic means for diverting the axial direction of flow of the concentrated jet as it is propulsively emitted from said device, and means for varying the direction of said magnetic field to effect steering of said device.

2. The combination of a jet propelled device and a means for steering said device, comprising means in said device for producing a concentrated beam of ionized propellant gases, a main outlet in said device through which said concentrated beam passes, said main outlet having a diameter substantially enlarged with respect to the concentrated beam of ions passing therethrough, magnetic means mounted near said main outlet for producing a magnetic field, diverting the axial direction of flow of the said concentrated beam of ions as it is emitted from said outlet, and means for varying the direction of said magnetic field whereby to effect steering of said device responsive to said variation of said magnetic field.

3. The device as defined in claim 2 wherein the magnetic means comprises a series of radially disposed magnets selectively energizable as polar pairs at a selected radial angle with respect to said jet.

4. The device as defined in claim 2 wherein the jet comprises an ionic plasma.

5. Device as defined in claim 2 wherein the magnetic means comprise opposite polar elements rotatably mounted about said jet and means for rotating said magnets to provide a magnetic field about said jet at any preselected angle for the diversion of said jet for consequent steering effect thereof.

*6. In a jet propelled space craft, a wall means including a main outlet for conveying and discharging propellant gases axially of said space craft, means for producing a beam of ionized propellant gases, means for concentrating said propellant gases inward from said wall means, and means for varying the axial direction of flow of the concentrated ionized propellant beam as it is emitted from said outlet for steering said space craft.*

*7. The method of steering a jet propelled space craft having a wall including a main outlet comprising passing a concentrated ionized beam inward from said wall through said outlet, and varying the axial direction of flow of said ionized propellant beam as it is emitted through said outlet to effect steering of said space craft.*

References Cited by the Examiner

The following references, cited by the Examiner, are of record in the patented file of this patent or the original patent.

UNITED STATES PATENTS

| | | | |
|---|---|---|---|
| 855,165 | 5/1907 | Cutter | 60—35.54 |
| 1,642,752 | 9/1927 | Landon | 60—35.55 |
| 1,690,043 | 10/1928 | Wallis | 60—35.54 |
| 2,102,421 | 12/1937 | Kuehni | 313—79 |
| 2,465,457 | 3/1949 | Johnston | 244—52 |
| 2,763,125 | 9/1956 | Kadosch et al. | 60—35.54 |
| 2,868,478 | 1/1959 | McCloughy | 244—52 X |
| 2,875,578 | 3/1959 | Kadosch et al. | 60—35.54 |
| 2,907,915 | 10/1959 | Gleichauf | 313—79 |
| 2,974,907 | 3/1961 | Eggers et al. | 244—52 |
| 3,036,430 | 5/1962 | Eggers et al. | 60—35.54 |
| 3,041,824 | 7/1962 | Berhman | 60—35.5 X |
| 3,049,877 | 8/1962 | Sherman | 60—35.55 |
| 3,071,154 | 1/1963 | Cargill et al. | |

FOREIGN PATENTS

| | | |
|---|---|---|
| 1,025,715 | 1/1953 | France. |

OTHER REFERENCES

Flight Magazine, Jan. 13, 1961, pages 42 and 43.

Space/Aeronautics Publication—"How Close Is a Practical Plasma Rocket?," Space/Aeronautics Magazine, March 1960, pages 50–54.

CARLTON R. CROYLE, *Primary Examiner.*